Dec. 20, 1955  J. B. WALLACE ET AL  2,727,939
BUS DUCT
Filed Oct. 16, 1951  2 Sheets-Sheet 1

WITNESSES:

INVENTORS
James B. Wallace
and William F. Born.
BY
Ralph H. Swingle
ATTORNEY

Dec. 20, 1955    J. B. WALLACE ET AL    2,727,939
BUS DUCT
Filed Oct. 16, 1951    2 Sheets-Sheet 2
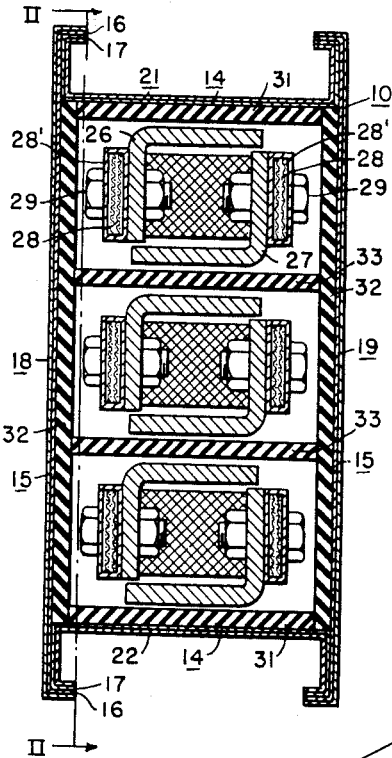
Fig. 3.
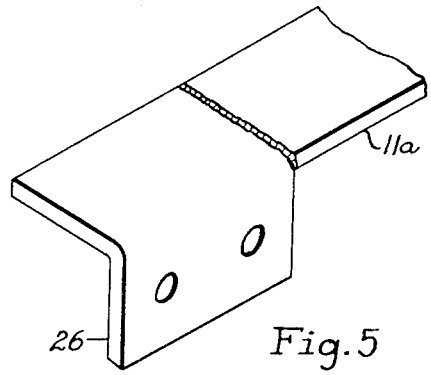
Fig. 5
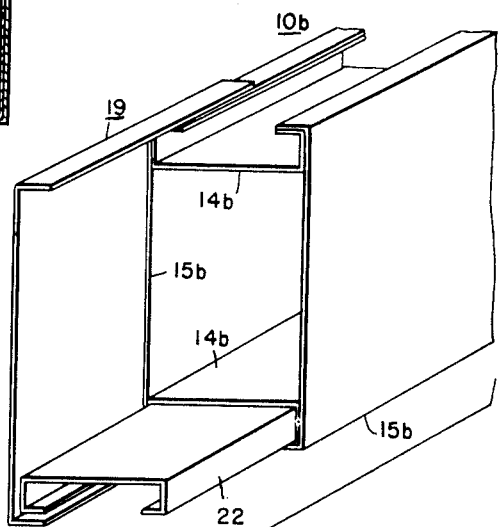
Fig. 4.
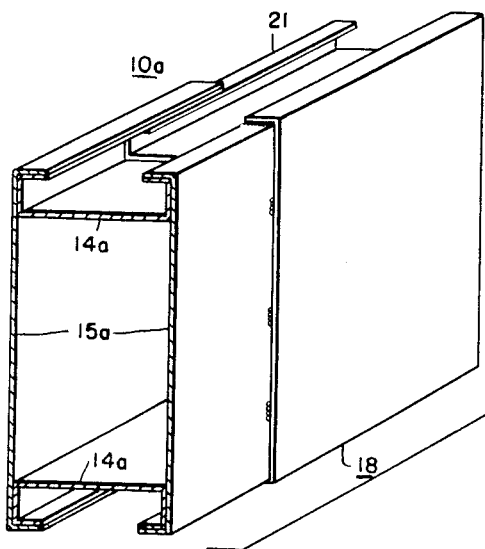
WITNESSES:
E. A. McCloskey
Nw. L. Groone
INVENTORS
James B. Wallace
and William F. Born.
BY Ralph H. Swingle
ATTORNEY

United States Patent Office 2,727,939
Patented Dec. 20, 1955

2,727,939

BUS DUCT

James B. Wallace and William F. Born, Beaver, Pa., assignors to Westinghouse Electric Corporation, East Pittsburgh, Pa., a corporation of Pennsylvania Application October 16, 1951, Serial No. 251,494

7 Claims. (Cl. 174—88)

Our invention relates, generally, to bus duct and, more particularly, to expansion joints for bus duct of the type wherein copper bus bars are enclosed in a steel duct or housing.

When installing bus duct, it is necessary to provide expansion joints in long straight runs to compensate for the difference in the coefficients of expansion for steel and copper. Also, an expansion joint must be used wherever a run of duct crosses an expansion joint in the building in which the bus duct is installed. Furthermore, an expansion joint may be used to make adjustments for variations in dimensions encountered when installing the duct.

An object of our invention, generally stated, is to provide a bus duct expansion joint which shall be simple and efficient in operation and which may be economically manufactured and installed.

A more specific object of our invention is to provide an expansion joint which will permit a relatively large amount of movement between the connected members.

Another object of our invention is to provide a bus duct expansion joint which requires a relatively small amount of space in the duct housing.

A further object of our invention is to provide a bus duct expansion joint which will permit movement of the bus bars relative to the housing or movement between two sections of housing.

Other objects of our invention will be explained fully hereinafter or will be apparent to those skilled in the art.

In accordance with one embodiment of our invention, an expansion joint for bus duct is provided by overlapping the ends of the bus bars for each phase and connecting the ends through a flexible copper braid the plane of which is at right angles to the plane of the bus bars. The length of the steel housing is varied by telescopic action obtained by providing overlapping splice plates at the joint.

For a better understanding of the nature and objects of the invention, reference may be had to the following detailed description, taken in conjunction with the accompanying drawings in which:

Figure 3 is a view in section, taken along the line III—III in Figure 2;

Figure 4 is an exploded view, in perspective, of the telescopic portion of the duct housing, the view being taken from the left-hand side of Fig. 2, and Figure 5 is a view, in perspective, of a portion of a bus bar and a connector utilized in the expansion joint.

Figure 1:
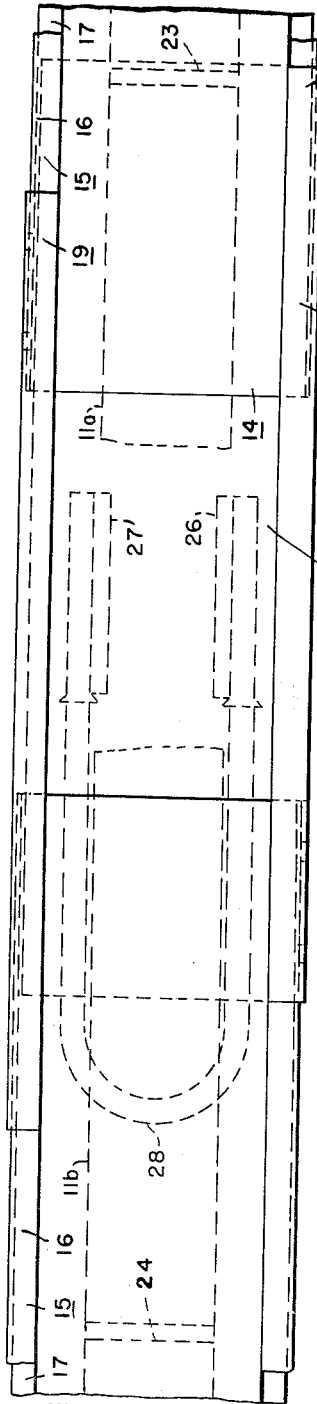
Figure 1 is a view, in plan, of a bus duct expansion joint embodying the principal features of the invention.

Referring to the drawings, the three-phase bus duct shown therein comprises a housing 10 containing three pairs of bus bars 11, 12, and 13, there being one pair for each phase of the three-phase structure. As shown most clearly in Figure 2, each phase or pair comprises two bus bars which are joined together by a flexible conductor in a manner which will be more fully described hereinafter. The bus bars may be supported in the housing 10 by suitable insulators in a manner well known in the art.

Figure 2:
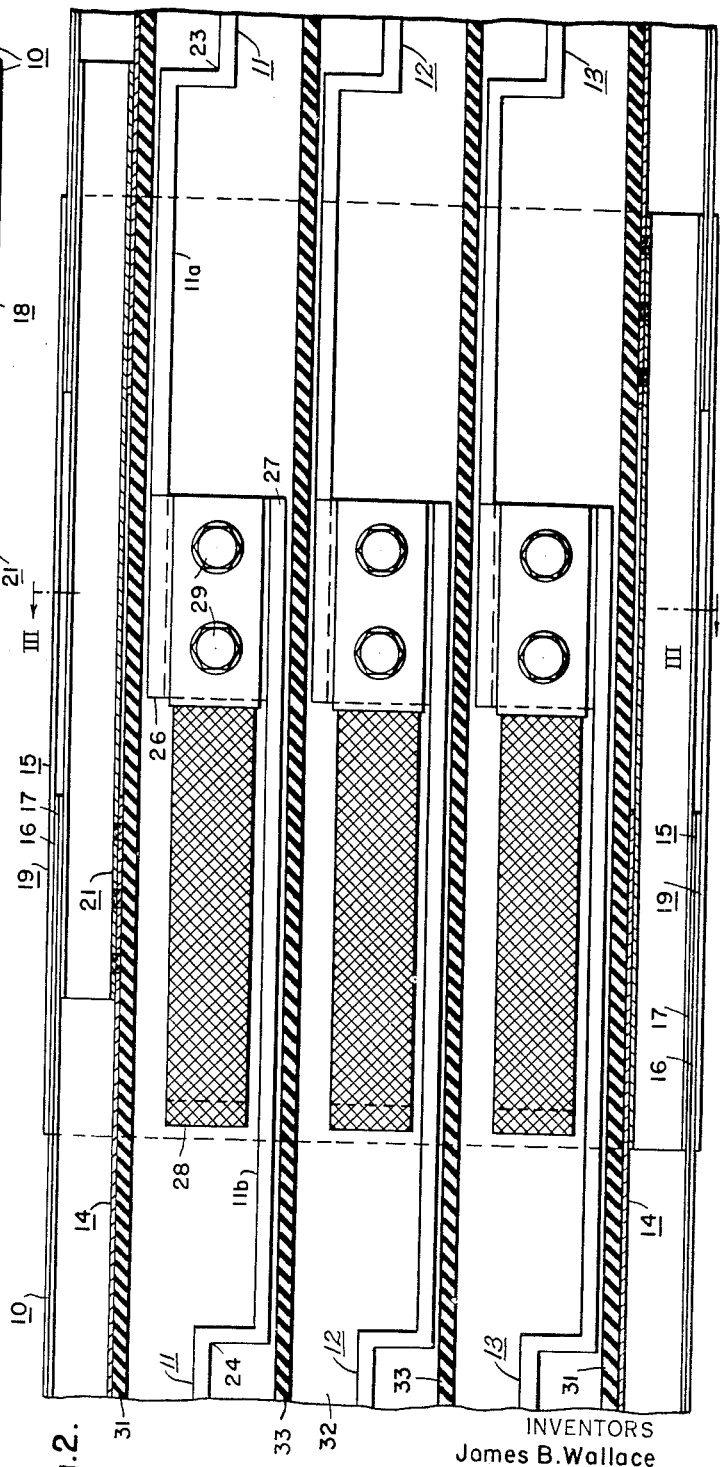
Figure 2 is a view in section taken along the line II—II in Figure 3.

As shown most clearly in Figures 2 and 3, the housing 10 is generally rectangular in shape and comprises top and bottom channel members 14 and side members 15 having flanges 16 which overlap inturned flanges 17 on the channel members 14. The housing 10 is preferably composed of metal, such as sheet steel.

As explained hereinbefore, it is desirable to provide expansion joints at predetermined locations in a bus duct installation. The expansion joint for the housing 10 shown in Figure 4 comprises splice plates 18 and 19 for the side plates 15 and splice plates 21 and 22 for the channels 14. The splice plates 18 and 19 are so disposed on the side plates 15, and the splice plates 21 and 22 are so disposed on the channels 14 in staggered relation that the two sections 10a and 10b of the housing 10, which are joined by the expansion joint, may move longitudinally a predetermined distance without causing on opening between the two housing sections.

The splice plate 18 may be welded or otherwise secured to the side plate 15a on the housing section 10a. The splice plate 19 may be secured to the side plate 15b on the housing section 10b. Likewise, the splice plate 21 may be secured to the channel 14a of the housing section 10a, and the splice plate 22 may be secured to the channel 14b of the housing section 10b. In this manner a telescopic action is obtained in the expansion joint for the housing since the splice plates which are secured to one section of the housing are free to slide over members of the other section of the housing.

As shown in Figure 2, a portion 11a of phase bar 11 is bent upwardly or offset at 23, and another portion 11b is bent downwardly at 24, thereby placing the ends of these bus bars in two parallel planes. As shown in Figures 3 and 5, an angle or L-shaped portion 26 is provided on the end of the bus bar 11a, and a similar L-shaped portion 27 is provided on the bus bar 11b. The angle-shaped portions may be provided by bending a portion of the bus bar into the desired shape, or an L-shaped connector 26 may be brazed to the end of the bus bar as shown in Fig. 5.

As shown in Figure 3, the L-shaped portions 26 and 27 of the bus bars 11a and 11b normally overlap each other to form a rectangle. The L-shaped portions 26 and 27 are joined together by a flexible conductor 28 which is preferably a piece of copper braid. The conductor 28 may be attached to the L-shaped members 26 and 27 by means of connectors 28' and bolts 29.

As shown, the conductor 28, which is generally rectangular in cross section, is so mounted in the housing that the plane of the conductor is at right angles to the planes of the bus bars 11a and 11b which it joins together. Since the ends of the bus bars 11a and 11b are offset in the manner shown, sufficient space is provided between the overlapping ends of the bus bars for the conductor 28 without the conductor interfering with the longitudinal movement of the bus bars during their expansion or contraction, with the movement of the bus bars being limited by the length of the conductor 28.

Also, as shown in Figure 3, sufficient space is available between the vertical portions of the L-shaped members 26 and 27 for connecting the flexible conductor 28 to these members by means of the bolts 29. In this manner, an expansion joint may be provided for each phase of a three-phase bus duct without it being necessary to increase the normal size of the bus duct housing 10. The expansion joints for the bus bars of phases 12 and 13 are similar in construction to the joint for phase 11.

The copper conductors for each phase of the expansion joint may be insulated from each other and from the steel housing 10 by means of insulating members 31 and 32 which are disposed around the joint inside the housing 10 and partition members 33 which are disposed between phases of the expansion joint. These insulating members may be secured in the housing in any suitable manner. The insulating members which surround the joint may be of sufficient length to prevent the conductors from being exposed during expansion of the joint.

From the foregoing description, it is apparent that we have provided an expansion joint for bus duct which permits movement of the copper bus bars in the duct relative to the housing, thereby compensating for the difference in the coefficients of expansion of copper and steel. The expansion joint will also permit movement between the two sections of the housing to adjust for dimensional variations encountered when installing the bus duct in service. Also, the expansion joint will permit the bus duct to be installed across expansion joints provided in buildings or other structures to permit movement between two portions of the structure.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In an expansion joint, in combination, a pair of substantially flat bus bars disposed in parallel planes and having angle-shaped offset ends disposed parallel to the longitudinal axis of the bus bars, and a generally U-shaped flexible conductor having its legs connected to the angle portions of said ends, the plane of the conductor being at right angles to the planes of the major portions of the bus bars, the legs of the U varying in proportionate length with longitudinal movement of the bus bars, the curvature of the flexible conductor being substantially the same during said movement.

2. In an expansion joint, in combination, a pair of substantially flat bus bars disposed in parallel planes and having angle-shaped ends disposed parallel to the longitudinal axis of the bus bars, said angle-shaped ends being overlapped to form a rectangle, and a generally U-shaped flexible conductor having its legs connected to the angle portions of said ends, the legs of the U varying in proportionate length with longitudinal movement of the bus bars.

3. In an expansion joint, in combination, a pair of substantially flat bus bars with offset end portions disposed in parallel planes, L-shaped connectors having one leg secured to the offset ends, the other leg of each connector being parallel to the longitudinal axis of its bus bar, and a flexible conductor having its ends attached to the other legs of said connectors to form a U-shaped member, the legs of the U varying in proportionate length with longitudinal movement of the bus bars, the curvature of the flexible conductor being substantially the same during said movement.

4. In an expansion joint, in combination, a pair of substantially flat bus bars with offset end portions disposed in parallel planes, L-shaped connectors having one leg secured to the offset ends, the other leg of each connector being parallel to the longitudinal axis of its bus bar, said L-shaped connectors overlapping to form a rectangle, and a generally U-shaped flexible conductor having its ends attached to the other legs of said connectors with the plane of the conductor being at right angles to the planes of the bus bars, the legs of the U varying in proportionate length with longitudinal movement of the bus bars.

5. In an expansion joint for bus duct, in combination, a generally rectangular housing, a plurality of pairs of substantially flat bus bars mounted in the housing, the bus bars of each pair having offset end portions disposed in parallel planes, L-shaped connectors having one leg secured to the offset ends, the other leg of each connector being parallel to the longitudinal axis of its bus bar, the L-shaped connectors for each pair of bus bars overlapping to form a rectangle, a generally U-shaped flexible conductor having its ends attached to the other legs of said connectors, the legs of the U varying in proportionate length with longitudinal movement of the bus bars, and insulating means disposed in the housing around the connectors and the flexible conductor for each pair of bus bars.

6. In an expansion joint for bus duct, in combination, a generally rectangular housing comprising two sections having abutting ends, splice plates overlapping the abutting ends, a plurality of pairs of substantially flat bus bars mounted in the housing, the bus bars of each pair having offset end portions disposed in parallel planes, L-shaped connectors having one leg secured to the offset ends, the other leg of each connector being parallel to the longitudinal axis of its bus bar, the L-shaped connectors for each pair of bus bars being overlapped to form a rectangle, a generally U-shaped flexible conductor having its ends attached to the other legs of said connectors, the legs of the U varying in proportionate length with longitudinal movement of the bus bars, and insulating means disposed in the housing between the pairs of bus bars to separate the conductors.

7. In an expansion joint for bus duct, in combination, a generally rectangular housing comprising two sections having abutting ends, splice plates overlapping the abutting ends, a plurality of pairs of substantially flat bus bars mounted in the housing, the bus bars of each pair having offset end portions disposed in parallel planes, L-shaped connectors having one leg secured to the offset ends, the other leg of each connector being parallel to the longitudinal axis of its bus bar, the L-shaped connectors for each pair of bus bars being overlapped to form a rectangle, a generally U-shaped flexible conductor having its ends attached to the other legs of said connectors, the legs of the U varying in proportionate length with longitudinal movement of the bus bars, the curvature of the flexible conductor being substantially the same during said movement, the plane of the conductor being at right angles to the planes of the bus bars, and insulating means disposed in the housing between the pairs of bus bars to separate the conductors.

References Cited in the file of this patent
UNITED STATES PATENTS

| | | |
|---|---|---|
| 1,552,619 | Klugh | Sept. 8, 1925 |
| 1,588,556 | Thompson | June 15, 1926 |
| 1,967,340 | Van Splunter | July 24, 1934 |
| 2,033,743 | Shoemaker | Mar. 10, 1936 |
| 2,059,986 | Frank et al. | Nov. 3, 1936 |
| 2,122,298 | Scott, Jr. | June 28, 1938 |
| 2,167,378 | Shoemaker | July 25, 1939 |
| 2,269,493 | Thomas | Jan. 13, 1942 |
| 2,297,279 | Attwood | Sept. 29, 1942 |
| 2,542,669 | Harrison | Feb. 20, 1951 |